March 20, 1962 A. MARINI, SR 3,026,116
QUICK-CHANGE TOOL ADAPTER

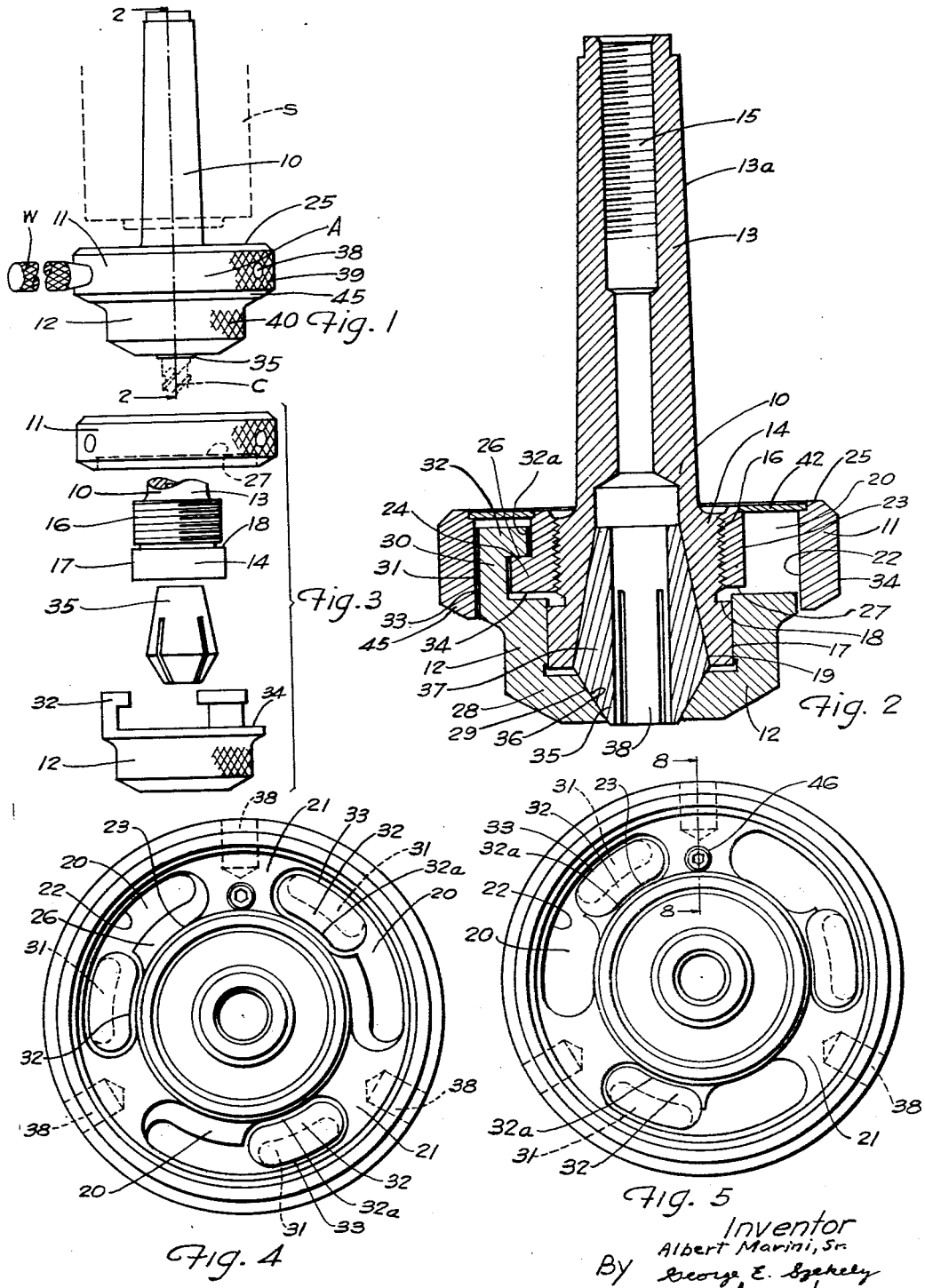

Filed Nov. 1, 1960 3 Sheets-Sheet 2

Inventor
Albert Marini, Sr.
By George E. Szekely
Agent

March 20, 1962     A. MARINI, SR     3,026,116
QUICK-CHANGE TOOL ADAPTER

Filed Nov. 1, 1960     3 Sheets-Sheet 3

Inventor
Albert Marini, Sr.
By George E. Szekely
Agent

United States Patent Office 3,026,116
Patented Mar. 20, 1962

3,026,116
QUICK-CHANGE TOOL ADAPTER
Albert Marini, Sr., 2834 W. Lawn Ave., Racine, Wis.
Filed Nov. 1, 1960, Ser. No. 66,499
15 Claims. (Cl. 279—48)

This invention relates to an adapter of the quick-change type. Such adapters are used with machine tool heads or spindles to facilitate attaching cutters of various types and sizes, as may be necessary for universal operation of the machine tool. Facility of tool changes is particularly important to adapt a given machine for progressive operations on one or more work pieces.

Adapters of the general class to which my invention pertains have been unduly complex and costly, often undependable and difficult to install or use. It is a principal object of my invention to provide a simple, inexpensive, yet durable, construction, which can be dependably and rapidly operated to clamp and unclamp cutting tools, as well as to exchange collets, other holders and cutters.

It is a further object of my invention to accommodate readily available collets and cutters of standard sizes and construction.

It is also an object to so construct the adapter that it may be readily utilized with standard collets or preset tool holders, retaining the same mode of adapter operation, and readily convertible from one type of holder to the other.

An additional object is to provide an adapter which is exceptionally compact, particularly in the axial direction, and which requires minimum headroom, thus conserving the working range of the head.

Another object is the provision of an adapter in which the clamping and unclamping operations are readily controllable to minimize danger of parts dropping on the machine table or operator.

Another object is to provide an adapter whose critical engaging surfaces are protected against fouling when in use on a machine.

A still further object is an arrangement whereby the adapter shank may be easily freed from machine tool spindles. For example, milling machines are customarily equipped with long-taper bores, into which the tapered adapter shank is pulled to a tight driving fit by means of draw-bar and wrench. Since tightness of fit increases under cutting pressures, it is frequently difficult to free the adapter by reverse wrenching on the draw-bar. In such case the operator may hammer the spindle housing, endangering the spindle mechanism. My novel adapter has self-contained means for freeing same without use of the draw-bar, or hazardous rapping of the spindle.

The foregoing and other objects and advantages of my novel adapter will be more readily apparent from the description and accompanying drawings, in which:

FIG. 1 is a view in elevation of the assembled adapter, with cutter, as applied to a machine tool;

FIG. 2 is an enlarged longitudinal section on line 2—2 of FIG. 1, with parts in engaged position;

FIG. 3 is an exploded elevation, showing the various parts preparatory to assembly;

FIG. 4 is a top view, cover omitted, showing parts in disengaged, collet loading or unloading position;

FIG. 5 is a top view, similar to FIG. 4, except with parts shown in clamping position;

Figure 6:
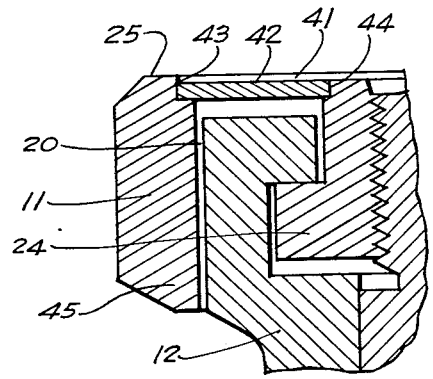
FIG. 6 is a partial section similar to FIG. 2, but enlarged to illustrate a detail.

In the drawings, similar reference characters are used to indicate corresponding parts throughout the several views. Referring to FIG. 1, the general method of applying my adapter will be readily understood, the construction details being illustrated in the other views. S represents a spindle, head, chuck or similar portion of a machine tool and C is a cutter or like tool to be clamped with respect to S. My adapter is designated as a whole by the letter A, the principal parts comprising a shank 10, ring 11, and cage 12. A wrench W may be used to operate ring 11 in a manner hereinafter to be described.

In the description hereafter, orientation of the parts will be indicated as for use in the vertical axis position shown in the drawings, but it will be understood that the adapter may be used equally well in any desired position of the axis.

Shank

Referring now to FIG. 2, shank 10 has a spindle-engaging portion 13 and a nose portion 14. Portion 13 may be tapered as shown at 13a, corresponding to the taper bore of a machine spindle, or may be of such other configuration as necessary to fit a particular machine head with which the adapter is to be used. While I show the adapter shank as suitable to fit a standard vertical milling machine spindle, it will be understood that my invention is not limited thereto. In the illustrated form I provide a tap 15 for engagement by a standard milling machine draw-bar (not shown) whereby the shank may be drawn into tight engagement with the spindle bore.

Nose 14 is an enlarged extension at the lower end of shank 10, with exterior threads 16 of greater diameter than the maximum diameter of spindle portion 13. Below the threads 16 there is a further exterior cylindrical enlargement 17, defining a shoulder stop 18. The nose 14 is provided with tapered socket 19, of a degree corresponding to the taper of a collet to be engaged thereby.

Ring

Ring 11 is tapered for close threaded fit to shank nose thread 16. The ring 11 has a plurality of annular slots 20, concentric with the adapter axis, the slots 20 being delimited in arcuate extent by webs 21, as best seen in FIGS. 4 and 5. While three slots 20 are shown as the preferred number for most satisfactorily locating and holding cage 12, as hereafter described, two or more slots may be used. For approximately half their arcuate extents slots 20 are of full axial depth throughout the radial extent defined by outer and inner faces 22 and 23. However, for the remainder of their arcuate extents slots 20 are partially constricted by ribs 24, correspondingly located in the respective slots 20. Ribs 24 extend radially outward from inner slot faces 23 to an arc approximately midway between faces 22 and 23. Ribs 24 extend circumferentially from webs 21 approximately half the arcuate extents of slots 20. The upper faces of ribs 24 lie in a plane below the upper face 25 of ring 11, defining shoulders 26, the plane of shoulders 26 being about midway between ring faces 25 and 27.

Cage

Cage 12 is generally cup-shaped and is made to a close sliding and rotating fit on cylindrical surface 17 of the shank nose 14. At its bottom the cage 12 has a frusto-conical flange portion 28 with an upwardly enlarging tapered bore 29, the length and degree of taper being such as to receive the nose of the particular collet which the adapter is designed to employ.

At its upper end cage 12 is provided around its outer circumference with three equally spaced prongs 30. Each prong 30 has a stem portion 31 terminating in an inwardly projecting lug portion 32. As will be seen particularly in FIGS. 4 and 5, prongs 30 are so disposed and shaped as to mate with slots 20, prongs 30 having arcuate extents approximately half those of corresponding slots 20. The outer radius of prongs 30, defining surfaces 33, is slightly less than the radius of outer slot surfaces 22, while the inner radius of lugs 32, defining surfaces 32a, is slightly greater than the radius of inner slot surfaces 23. Thus lugs 32 will pass into slots 20 when the parts are positioned as indicated in FIG. 4. The distance from the lower faces of lugs 32 to the upper face 34 of cage 12 is slightly greater than the thickness of annular ribs 24 of ring 11, as best seen in FIG. 2. Also, the inner radius of prong stems 31 is slightly larger than the outer radius of annular ribs 24. Therefore, stems 31 have radial thickness slightly less than the width of constricted slot portions delimited by outer slot surfaces 22 and ribs 24. The mean radius of stems 31 is substantially that of the constricted slot portions.

The collet 35 is of a split type such as well-known in the art. It has a short steeply tapered nose 36 to be held by conical bore 29 of cage 12. The tapered locking skirt 37 fits in socket 19 of shank nose 14. In its expanded condition the collet bore 38 is sized to receive freely the straight shank of a cutter or like tool C (FIG. 1). When contracted, collet 35 clamps the tool shank with a firm driving grip. While I have shown a particular collet which I find well suit to use in my novel adapter, it will be readily understood that details of the adapter can be modified to accommodate other collets of similar character without departing from the spirit and scope of my invention.

*Operation*

For the purposes of this description, direction of rotation will be stated as viewed from the top, that is, the views of FIGS. 4 and 5. Assembly and installation of the adapter is quite simple, this being one of the salient features of my invention. The relationship of the parts preparatory to assembly may best be seen in FIG. 3. Ring 11 is first passed over spindle portion 13 of shank 10 and screwed on thread 16, until face 27 of ring 11 strikes stop shoulder 18 of nose 14. Shank 10 may now be stabbed and tightened in a machine spindle S as shown in FIG. 1, this being a convenient way of holding the shank 10 during subsequent steps. However, insertion in the machine at this stage is not essential, as the adapted can be readily preassembled and then mounted in a machine, if more convenient in a particular case. Ring 27 being against shank shoulder 18, cage 12, holding collet 35, is presented to ring 11 with lugs 32 facing slots 20 in the relative rotational position shown in FIG. 4. Accurate alignment is assured during this and subsequent steps by virtue of cage 12 being piloted on surface 17 of shank nose 14. Such accuracy of alignment is obviously essential to insure uniform clamping action on the cutter or tool and accurate positioning of the latter with respect to the machine.

The lugs 32 are now stabbed into slots 20 until upper face 34 of cage 12 approaches or strikes lower face 27 of ring 11, lugs 32 then being entirely above ribs 24 of ring 11. Holding ring 11, cage 12 is rotated 1/6 turn clockwise, until lugs 32 strike ring webs 21, the prong stems 31 passing into the constricted portions of slots 20 between surfaces 22 and ribs 24. This position is shown in plan by FIG. 5. The relative axial position of the parts is substantially as in FIG. 2, lugs 32 now resting on shoulders 26. The selected cutter is now inserted into collet 35.

Holding cutter shank in collet, ring 11 is now screwed counterclockwise, thus drawing cage 12 toward nose 14 and forcing collet skirt 37 into tapered socket 19, whereby wedging of collet skirt 37 contracts collet 35 onto the cutter shank, gripping same. During this clamping movement, cage 12 turns with ring 11, lugs 32 being driven by webs 21. After making the assembly hand tight, final tightening is best accomplished with a wrench. In FIGS. 4 and 5 I show sockets 38 in several positions around the outside of ring 11, to receive a plain rod wrench W, FIG. 1. However, sockets may be similarly provided for standard spanner wrenches, or a strap wrench may be employed. Ring 11 and cage 12 are preferably knurled as indicated at 39 and 40, FIG. 1, to provide non-slip surfaces for operator's hand grip during assembly or removal.

To replace a tool or cutter C, FIG. 1, spindle S is locked against rotation, preventing rotation of shank 10. Ring 11 is then screwed clockwise, while cage 12 is held in position to turn with ring 11, maintaining the relative position of FIG. 5. This operation releases the axial clamping pressure on cage 12, allowing collet 35 to expand and release the tool, but cage 12 remains engaged with ring 11. To replace or change a collet, cage 12 is unclamped as heretofore described, but cage 12 is caused or allowed to move counterclockwise relative to ring 11, until the relative rotational position is as in FIG. 4, whereafter cage 12 may be withdrawn from ring 11 and the collet removed.

During normal usage, ring 11 is not fully unscrewed from shank 10, so the usual tool and collet changes are made without removing shank 10 from the machine spindle. It will also be noted that tool and collet changes are made without engaging or disengaging threads, this being a salient reason for my adapter's advantages in speed and dependability. I find that changes can be made in 10 seconds or less.

In such cases as the adapter is to be removed in its entirety, to change adapters, to move to another machine, to repair, or the like, ring 11 serves an advantageous additional function. Cage 12 having been removed as heretofore described, ring 11 may now be turned in a counterclockwise direction as many turns as necessary to bring face 25 into contact with the spindle nose, whereupon further turning of ring 11 exerts downward pressure on shank 10, freeing it from the spindle. Since the adapter is normally positioned with ring 11 close to the spindle nose, only a few turns of ring 11 are required to free the adapter in the manner described, and the additional function of shank removal is accomplished without substantial increase in length, or other variation of the dimensions or construction from those necessary to serve the primary functions. Due to the novel arrangement I have described, my adapter is exceptionally compact, without sacrifice of requisite strength in the several parts.

*Cover*

Another novel feature of my adapter is best understood by referring to FIG. 6. The upper ring face 25 is provided with a shallow annular recess 41 to receive a thin washer-like cover 42. The annulus of the recess, as defined by cylindrical walls 43 and 44, has a mean radius substantially the same as that of slots 20, but is slightly wider, so that cover 42 fully bridges the slots 20. Cover 42 is preferably press-fitted in recess 41 and has a thickness less than the depth of recess 41, so that, when seated, cover 42 remains permanently positioned with its upper face slightly below upper face 25 of ring 11. In this position cover 42 is not subject to pressure exerted on face 25, when turning ring 11 against a spindle nose, as above described. Cover 42 protects the slots 20 against entrance of chips or dirt from above. During operation in a machine, slots 20 are effectively shielded at their lower ends by ring skirt 45 and cage 12. Hence, the mating parts are thoroughly protected against foreign material which might otherwise interfere with manipulation of the parts.

*Modification*

Figure 7:
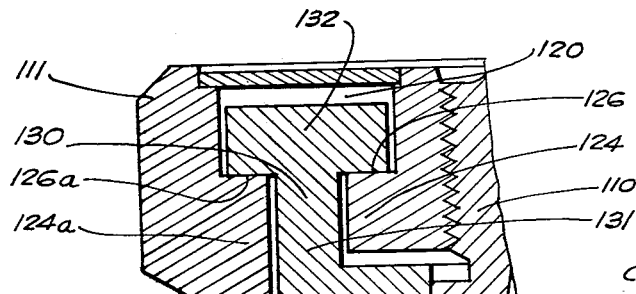
FIG. 7 is a partial section similar to FIG. 2, showing a lug modification.

FIG. 7 illustrates a modification of my invention which

I find desirable for some applications, particularly if exceptionally heavy clamping pressures are involved. The general construction and arrangement of parts is as previously described, except for the disposition of the clamping ribs and lugs. In FIG. 7, corresponding parts are numbered as before with the addition of 100. In this form, the slots 120 of ring 111 are of substantially the same size, configuration and location as the corresponding parts in the form heretofore described, but in lieu of a single outwardly extending rib in each slot, I here use opposed ribs 124 and 124a to define shoulders 126 and 126a. Cage 112 has upwardly extending prongs 130 with stems 131 and lugs 132. However, lugs 132 are symmetrically bifurcated to project radially inward and outward from stems 131, the prongs 130 being thus T-shaped in cross-section. With the cage 112 in the clamping position corresponding to FIG. 5, the stems 131 lie between ribs 124 and 124a, as clearly seen in FIG. 7. The clamping force is exerted equally on both sides of stems 131, placing the latter under direct tension only, rather than combined tension and bending of the construction in FIG. 2. Thus, the construction shown in FIG. 7 minimizes distortion or breakage of prongs.

Figure 8:
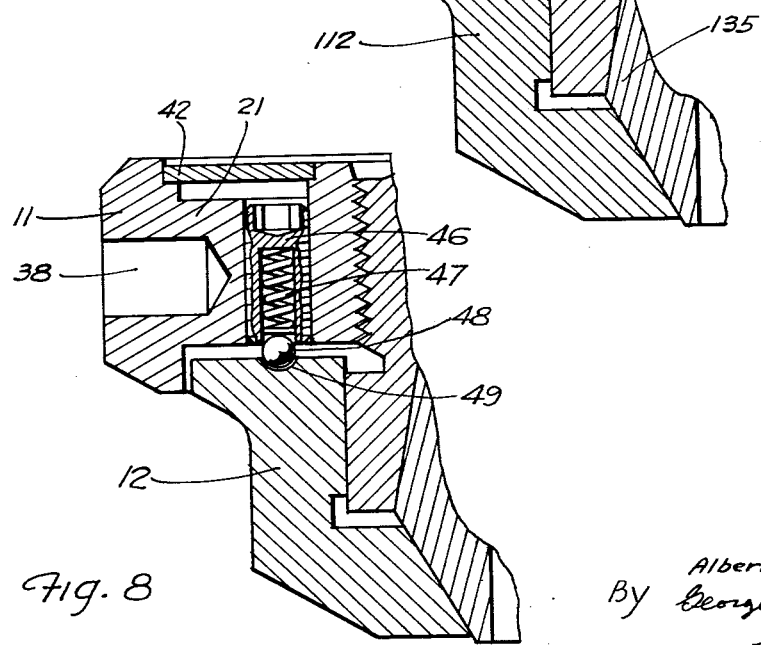
FIG. 8 is a partial section taken on line 8—8 of FIG. 5, illustrating the detent.

Since cutter changes require only relief of clamping pressure, it is desirable that cage 12 be held engaged with ring 11 during this operation. I find it convenient to provide a detent or the like, which may be inserted in the ring 11, as shown in FIGS. 5 and 8. The detent here shown is of the ball plunger type, comprising a hollow screw 46, entrained spring 47 and captive ball 48. The detent may be in any location for ball 48 to press on cage 12, but the position shown is one I find most suitable. For this arrangement, three dimples 49 are provided on upper cage face 34, equidistantly so located that the ball 48 will drop into one of the dimples 49 when the cage 12 is turned relative to ring 11 to the position of FIG. 5, regardless of the particular position of presentation in engaging the cage and ring. During the turn of cage 12 from the position of FIG. 4 to that of FIG. 5, face 34 of cage 12 depresses ball 48, until the ball 48 drops into one of the dimples 49. Cage 12 is thus releasably held in the position of FIG. 5, relative to ring 11, with sufficient resistance to relative rotation that cage 12 will turn with ring 11 when the latter is turned to release clamping pressure. The operator's hands are freed to turn the ring and hold the cutter. Otherwise, the inertia of cage 12 may be sufficient to permit relative rotation, whereby cage 12 would return to the position of FIG. 4 and drop out. When it is desired to remove the cage 12, only a slight counterclockwise torque need be applied to cage 12, while holding ring 11 against rotation. The detent, or equivalent device, is selected and adjusted for a releasing torque just sufficient to exceed the cage inertial effect, well within the operator's manual capacity, so that no wrench or other tool need be used.

*Preset Tooling*

Heretofore I have described the use of my adapter to hold a tool by means of a split collet, which is quite facile for a wide variety of machine work. However, in cases where it is necessary to assure precise axial positioning of tools with respect to a spindle for repetitive production of parts, requiring frequent tool changes, use of the collet may involve an excessive time for setting tools. It may then be preferable to use a holder designed for preset tooling, that is, an arrangement whereby the tools or cutters are set to the holders before they are clamped to the spindle and the clamping operation brings the tool to a predetermined position with respect to the spindle, thus eliminating time-consuming measurements and test runs on the machine.

Figures 9, 10:
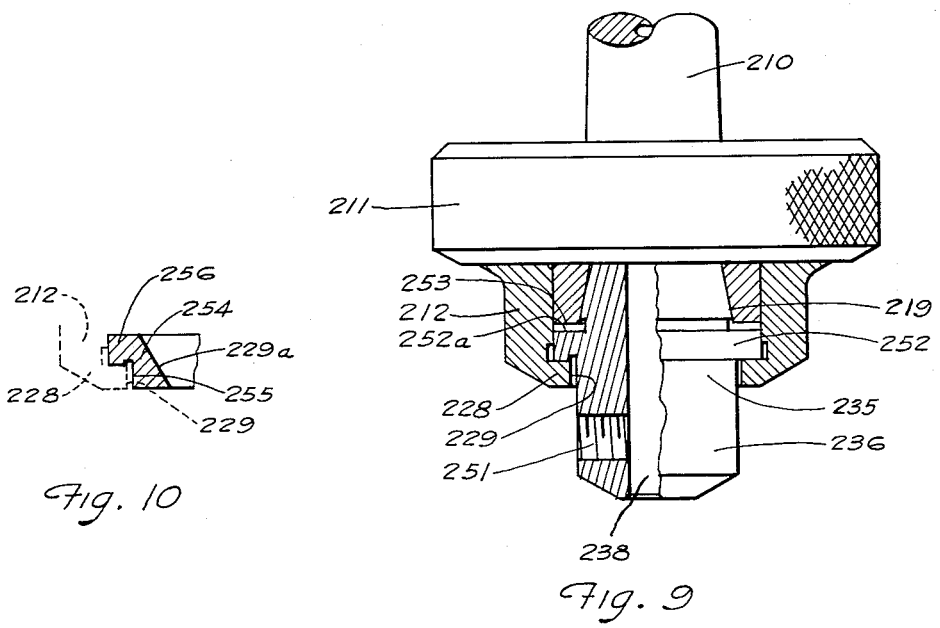
FIG. 9 is a view similar to FIG. 2, with the lower portion only in partial section, illustrating a modification of the adapter cage for use with a preset tool holder.
FIG. 10 is a fragmentary section of a bushing for converting the cage of FIG. 9 to receive a collet such as that shown in FIG. 2.

FIG. 9 illustrates the use of my adapter for preset tooling. In this view corresponding parts are numbered as before, with the addition of 200. The adapter shown has substantially the same construction and mode of operation as previously described, except that the collet is replaced by holder 235, to accommodate which I employ a slightly modified cage 212. Shank 210 and ring 211 may be identical to the corresponding parts 10 and 11 of other views. The holder 235 has a tapered skirt 237, fitting the tapered shank bore 219, and a barrel 236. Bore 238 is sized to fit standard cylindrical cutter shanks. Tap 251 in the barrel 236 receives a flush headless set screw (not shown) for adjustably clamping the cutter in the holder, cutters of the type used being regularly available with flats for this purpose. Between the barrel 236 and skirt 237, the holder has an exterior annular flange 252, defining shoulder 252a adjacent skirt 237.

Cage 212 has an inwardly extending annular flange 228 at its lower end. Cylindrical bore 229 fits around barrel 236, while flange 252 rests on flange 228. Thus, the upward motion of cage 212, drawn by ring 211, forces flange face 252a against shank end face 253, whereby to clamp flange 252 between shank 210 and cage 212 in a predetermined position. Flange face 252a of holder 235 is preferably finish ground as a plane of reference for setting a cutter. Setting may be done in the well-known manner with gauge or indicator. After the cutter or tool is set in the holder 235, the latter is dropped into cage 212, the adapter then being assembled and tightened as heretofore described. With all tools or cutters of a given machine setup being set to the same plane of reference, the tools or cutters may be replaced or interchanged without extensive machine down-time for setting, it being understood that shank 210 remains on the machine in set position, fixing reference face 253 with respect to the machine spindle.

While I have shown the holder skirt 237 as a relatively rigid member, it may optionally be made slightly contractible, for example by slitting in the manner of a collet. Such resilient deformability may be advantageous in assuring that flange face 252a will seat against shank end face 253, notwithstanding slight variations of fit along the taper 219.

In order to achieve maximum interchangeability of parts, I prefer to make the inner depth of cage 212 just sufficiently longer than the depth of previously described cage 12 as to accommodate flange 252 of the holder. It will be seen that the preset-holder type adapter of FIG. 9 can readily be changed to the collet type of FIG. 2 by merely exchanging cages. However, should it be desirable to minimize total tooling costs, the cage 212 may be made convertible by use of bushing 254, shown in FIG. 10. Bushing 254 has a short barrel 255 closely fitting cage bore 229 for approximately the length thereof. Flange 256 rests on cage flange 228. Bushing 254 has an upwardly enlarging tapered bore 229a, corresponding to bore 29 of cage 12, FIG. 2. To change from holder to collet, bushing 254 is substituted for holder 235, cage 212 then accommodating a collet such as that indicated at 35, FIG. 2, in the same manner as the adapter there shown.

While I have described certain preferred embodiments for purposes of illustration, it will be readily understood that various changes may be made in the form, construction and arrangement of parts without departing from the spirit and scope of the invention as defined by the appended claims.

Having thus described my invention, I claim the following:

1. A quick-change tool adapter comprising a shank having a socket at one end thereof, a ring threaded to said shank, a cage separably engageable with said ring, annularly disposed apertures in said ring, annularly disposed shoulders on said ring adjacent said apertures, prongs projecting from said cage in positions to enter said apertures, lugs on said prongs axially spaced from said cage, and a tool holder having portions disposed between said socket and said cage, whereby, after said prongs have been entered into said apertures, a turn of said cage relative to said ring causes said lugs to overlie said shoulders, a subsequent turn of said ring relative to said shank causing said cage to clamp said holder in said socket.

2. An adapter according to claim 1, including stop means on said ring limiting the turn of said cage relative to said ring.

3. An adapter according to claim 1, wherein at least one of said shoulders terminates in an abutment circumferentially spaced from an aperture adjacent said one shoulder.

4. An adapter according to claim 1, wherein said apertures comprise portions of annular slots, there being ribs constricting portions of said slots adjacent said apertures and defining said shoulders.

5. An adapter according to claim 1, wherein said apertures comprise portions of annular slots, there being ribs defining constricted portions of said slots concentrically adjacent said shoulders and communicating with said apertures, said prongs having stems adapted to enter said constricted portions of said slots when said cage is turned relative to said ring.

6. An adapter according to claim 1, said apertures comprising portions of annular slots, there being pairs of concentric opposed ribs defining constricted portions of said slots between pairs of shoulders, said constricted portions communicating with said apertures, said prongs having stems adapted to enter said constricted portions of said slots when said cage is turned relative to said ring, and said lugs being arranged for bilateral engagement with said shoulders.

7. A quick-change tool adapter comprising a shank having a nose and a socket at one end thereof, a ring threaded to said shank, annularly disposed apertures in said ring, a cage releasably engageable with said ring, annularly disposed prongs projecting from said cage in positions to enter said apertures, a seat in said cage, a tool holder fitting between said seat and said socket, and a bore in said cage closely fitting said nose, whereby said nose pilots said cage during assembly and manipulation thereof with said ring to clamp said holder in said socket.

8. A quick-change tool adapter comprising a shank having a socket at one end thereof, a ring threaded to said shank near said end, circumferentially spaced apertures in said ring open toward said end, a cage, members projecting axially from said cage, portions of said members being removably engageable with said ring through said apertures while said ring remains threaded to said shank, and tool-receiving means between said socket and said cage; whereby turning said ring in one direction relative to said shank, when said cage is engaged in said ring, causes said cage to clamp said means in said socket, and subsequently turning said ring in the opposite direction releases said cage and said means for removal while said ring remains threaded to said shank.

9. An adapter according to claim 8, wherein said means is a collet, said collet and said socket having mating tapered portions whereby to contract said collet when clamped in said socket by said cage.

10. An adapter according to claim 8, wherein said shank has an annular face adjacent to said socket, said tool-receiving means being provided with an abutment contacting said face to locate said means in predetermined position axially of said shank when said means is clamped in said socket.

11. An adapter according to claim 1, said shank including a spindle portion remote from said socket, and a nose portion encompassing said socket, said nose portion being of larger diameter than said spindle portion, threads on said nose portion terminating inwardly of said socket end, the diameter of said threads being intermediate between diameters of the spindle portion and the unthreaded nose portion, said unthreaded nose portion constituting a stop limiting travel of said ring toward said socket end at a position of said ring to accommodate engagement or removal of said cage while said ring remains threaded to said shank.

12. An adapter according to claim 1, portions of said apertures extending entirely through said ring, an annular cover for said apertures on the face of said ring remote from said cage, and a skirt on said ring encompassing said apertures, whereby said cover, said cage and said skirt comprise an enclosure for said apertures when said cage is engaged with said ring.

13. An adapter according to claim 1, wherein portions of said apertures extend entirely through said ring, and a cover for said apertures inset below the face of said ring remote from said cage.

14. An adapter according to claim 1, including on said shank a tapered spindle portion adapted to a driving fit with a correspondingly tapered machine spindle, said ring being threaded to a nose portion of said shank adjacent to said spindle portion, whereby turning said ring in a direction for axial movement away from said spindle portion releases said cage for removal from said ring, whereafter turning said ring in the opposite direction causes said ring to bear on said spindle, forcing said shank from said spindle while said ring remains threaded to said shank.

15. An adapter according to claim 1, including means effective to restrain turning of said cage relative to said ring when said ring is turned in a direction to relieve clamping pressure on said holder.

References Cited in the file of this patent
UNITED STATES PATENTS

| | | |
|---|---|---|
| 2,374,725 | Blake | May 1, 1945 |
| 2,436,848 | Benjamin | Mar. 2, 1948 |
| 2,727,748 | Benjamin | Dec. 20, 1955 |
| 2,821,401 | Eben | Jan. 28, 1958 |
| 2,885,211 | Sima | May 5, 1959 |
| 2,918,291 | Plantas | Dec. 22, 1959 |

UNITED STATES PATENT OFFICE
CERTIFICATE OF CORRECTION

Patent No. 3,026,116                      March 20, 1962

Albert Marini, Sr.

It is hereby certified that error appears in the above numbered patent requiring correction and that the said Letters Patent should read as corrected below.

Column 2, line 44, for "tapered" read -- tapped --; column 3, line 31, for "suit" read -- suited --; line 50, for "adapted" read -- adapter --.

Signed and sealed this 21st day of August 1962.

(SEAL)
Attest:

ESTON G. JOHNSON                      DAVID L. LADD

Attesting Officer                      Commissioner of Patents